(12) United States Patent
Aoki et al.

(10) Patent No.: US 9,692,916 B2
(45) Date of Patent: Jun. 27, 2017

(54) FACSIMILE SYSTEM, INFORMATION PROCESSING DEVICE, AND COMPUTER-READABLE STORAGE MEDIUM

(71) Applicants: Junki Aoki, Kanagawa (JP); Makoto Sasaki, Kanagawa (JP); Takuya Mori, Tokyo (JP); Itaru Kodaira, Kanagawa (JP); Yukinori Ishii, Kanagawa (JP); Hiroaki Ikkanzaka, Tokyo (JP); Tomohiro Kuroyanagi, Kanagawa (JP); Fumiyoshi Kittaka, Kanagawa (JP); Koichiro Maemura, Kanagawa (JP)

(72) Inventors: Junki Aoki, Kanagawa (JP); Makoto Sasaki, Kanagawa (JP); Takuya Mori, Tokyo (JP); Itaru Kodaira, Kanagawa (JP); Yukinori Ishii, Kanagawa (JP); Hiroaki Ikkanzaka, Tokyo (JP); Tomohiro Kuroyanagi, Kanagawa (JP); Fumiyoshi Kittaka, Kanagawa (JP); Koichiro Maemura, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 15/046,802

(22) Filed: Feb. 18, 2016

(65) Prior Publication Data

US 2016/0277603 A1    Sep. 22, 2016

(30) Foreign Application Priority Data

Mar. 17, 2015 (JP) ................................ 2015-053946

(51) Int. Cl.
*G06F 3/12* (2006.01)
*H04N 1/00* (2006.01)

(52) U.S. Cl.
CPC ..... *H04N 1/00244* (2013.01); *H04N 1/00206* (2013.01); *H04N 2201/0017* (2013.01); *H04N 2201/0094* (2013.01)

(58) Field of Classification Search
CPC ............ H04N 1/00244; H04N 1/00206; G06F 3/1207; G06F 3/1288; G06F 3/1236
(Continued)

(56) References Cited

U.S. PATENT DOCUMENTS 5,293,253 A    3/1994    Kida et al.
5,394,462 A    2/1995    Maemura
(Continued)

FOREIGN PATENT DOCUMENTS

JP    2004-252542    9/2004
JP    2014-192601    10/2014

OTHER PUBLICATIONS

U.S. Appl. No. 14/717,166, filed May 20, 2015.

*Primary Examiner* — Marivelisse Santiago Cordero
*Assistant Examiner* — Neil R McLean
(74) *Attorney, Agent, or Firm* — Harness, Dickey & Pierce, P.L.C.

(57) ABSTRACT

An information processing device include a facsimile obtaining unit obtaining a facsimile; a specifying unit that specifies a subsidiary unit as a transfer target of the facsimile; an executable notification method information obtaining unit obtaining executable notification method information indicating a facsimile reception notification method that can be executed in the subsidiary unit; a notification priority information obtaining unit obtaining notification priority information in which priority information is associated for each piece of notification method information indicating a facsimile reception notification method; a determining unit determining a facsimile recep-
(Continued)

tion notification method to execute based on the executable notification method information and the notification priority information; a notification method information notifier notifying the subsidiary unit of notification method information indicating the determined facsimile reception notification method; and a print instructor instructing the subsidiary unit to print the facsimile.

20 Claims, 15 Drawing Sheets

(58) Field of Classification Search
USPC .......................................................... 358/1.15
See application file for complete search history.

(56) References Cited

U.S. PATENT DOCUMENTS

| | | | |
|---|---|---|---|
| 5,585,941 A | 12/1996 | Maemura | |
| 5,633,731 A | 5/1997 | Maemura | |
| 6,281,980 B1 | 8/2001 | Maemura et al. | |
| 7,054,023 B2 | 5/2006 | Maemura | |
| 7,382,476 B1 | 6/2008 | Maemura | |
| 7,408,664 B2 | 8/2008 | Maemura | |
| 8,731,154 B2 * | 5/2014 | Shin | H04L 12/2809 379/100.01 |
| 8,970,881 B1 * | 3/2015 | Schwarz | H04N 1/00204 358/1.13 |
| 2003/0072032 A1 | 4/2003 | Maemura | |
| 2005/0248584 A1 | 11/2005 | Takeo et al. | |
| 2005/0254085 A1 | 11/2005 | Oshikiri et al. | |
| 2006/0114918 A1 | 6/2006 | Ikeda et al. | |
| 2006/0227143 A1 | 10/2006 | Maita et al. | |
| 2008/0094667 A1 | 4/2008 | Kodaira | |
| 2009/0094694 A1 | 4/2009 | Kodaira | |
| 2009/0300529 A1 | 12/2009 | Endoh et al. | |
| 2010/0103462 A1 | 4/2010 | Maemura | |
| 2012/0023451 A1 | 1/2012 | Kuroyanagi | |
| 2012/0144329 A1 | 6/2012 | Sasaki | |
| 2013/0208310 A1 * | 8/2013 | Nakashima | H04N 1/00244 358/1.15 |
| 2013/0329253 A1 | 12/2013 | Sasaki | |
| 2013/0346522 A1 * | 12/2013 | Lennstrom | H04L 51/14 709/206 |
| 2015/0271353 A1 | 9/2015 | Nishimura et al. | |
| 2015/0293728 A1 | 10/2015 | Nishimura et al. | |

* cited by examiner

FIG.7

| FACSIMILE NUMBER OF TRANSMISSION SOURCE | ADDRESS OF SUBSIDIARY UNIT OF TRANSFER DESTINATION |
|---|---|
| 03xxxxxxxx | 11.22.33.44 |
| 06yyyyyyyy | 111.222.233.244 |
| 042zzzzzzz | 155.123.145.167 |
| 03xxxxyyyy | 200.201.200.202 |
| 03aaaabbbb | 11.33.55.77 |
| NOT APPLICABLE | 1.2.3.4 |

FIG.8

| |
|---|
| NOTIFICATION TO SMART DEVICE |
| NOTIFICATION VIA LIGHTING OF LED LAMP |
| NOTIFICATION VIA DIALOGUE DISPLAY |

| PRIORITY INFORMATION | NOTIFICATION METHOD INFORMATION |
|---|---|
| HIGH ⋮ LOW | NOTIFICATION TO SMART DEVICE |
| | NOTIFICATION VIA DIALOGUE DISPLAY |
| | NOTIFICATION VIA BEEP SOUND |
| | NOTIFICATION VIA LIGHTING OF LED LAMP |
| | NOTIFICATION VIA LIGHTING OF PATLITE |

FIG.14

FACSIMILE RECEIVED.
DEPRESS "PRINT NOW" IF YOU WANT TO PRINT NOW.

NOT NOW    PRINT NOW

FIG.17

| | | TEMPORAL INFORMATION | |
|---|---|---|---|
| | | 9:30 – 18:00 | 18:00 – 9:30 |
| PRIORITY INFORMATION | HIGH ⋮ LOW | NOTIFICATION TO SMART DEVICE | NOTIFICATION VIA LIGHTING OF PATLITE |
| | | NOTIFICATION VIA DIALOGUE DISPLAY | NOTIFICATION VIA LIGHTING OF LED LAMP |
| | | NOTIFICATION VIA BEEP SOUND | NOTIFICATION VIA BEEP SOUND |
| | | NOTIFICATION VIA LIGHTING OF LED LAMP | NOTIFICATION VIA DIALOGUE DISPLAY |
| | | NOTIFICATION VIA LIGHTING OF PATLITE | NOTIFICATION TO SMART DEVICE |

FIG.18

| | | USER IDENTIFYING | |
|---|---|---|---|
| | | USER A | USER B |
| PRIORITY INFORMATION | HIGH ⋮ LOW | NOTIFICATION TO SMART DEVICE | NOTIFICATION VIA DIALOGUE DISPLAY |
| | | NOTIFICATION VIA DIALOGUE DISPLAY | NOTIFICATION VIA BEEP SOUND |
| | | NOTIFICATION VIA BEEP SOUND | NOTIFICATION VIA LIGHTING OF LED LAMP |
| | | NOTIFICATION VIA LIGHTING OF LED LAMP | NOTIFICATION VIA LIGHTING OF PATLITE |
| | | NOTIFICATION VIA LIGHTING OF PATLITE | NOTIFICATION TO SMART DEVICE |

FACSIMILE SYSTEM, INFORMATION PROCESSING DEVICE, AND COMPUTER-READABLE STORAGE MEDIUM

CROSS-REFERENCE TO RELATED APPLICATION

The present application claims priority to and incorporates by reference the entire contents of Japanese Patent Application No. 2015-053946 filed in Japan on Mar. 17, 2015.

BACKGROUND OF THE INVENTION

1. Field of the Invention

The present invention relates to a facsimile system, an information processing device, and a computer-readable storage medium.

2. Description of the Related Art

Known has been a technique of connecting a base unit as a facsimile device which is connected to a public line to a subsidiary unit as an image processing device which is not connected to a public line via a LAN (Local Area Network) and the like to transmit a facsimile outward from the subsidiary unit not connected to the public line via the base unit and receive a facsimile externally by the subsidiary unit not connected to the public line via the base unit, as disclosed in Japanese Laid-open Patent Publication No. 2014-192601, for example.

However, the subsidiary unit does not necessarily include a function of notifying a reception of a facsimile like a facsimile device since the subsidiary unit is not required to include a facsimile function in the conventional technique explained above.

There is therefore a possibility that the subsidiary unit is not capable of causing the reception of the facsimile to be known to the surroundings like a facsimile device would do when receiving the facsimile transferred from the base unit.

Therefore, there is a need for a facsimile system, an information processing device, and a storage medium which are capable of causing a reception of a facsimile to be known to the surroundings.

SUMMARY OF THE INVENTION

It is an object of the present invention to at least partially solve the problems in the conventional technology.

According to an embodiment, there is provided a facsimile system that includes a facsimile device; an information processing device; and at least one image forming device. The facsimile device includes a facsimile receiver configured to receive a facsimile, and a facsimile notifier configured to notify the information processing device of the facsimile. The information processing device includes a specifying unit configured to specify a transfer target image forming device as a target of a transfer of the facsimile among the at least one image forming device, an executable notification method information obtaining unit configured to obtain, from the transfer target image forming device, executable notification method information indicating at least one facsimile reception notification method that is executable in the transfer target image forming device, a notification priority information obtaining unit configured to obtain notification priority information in which priority information indicating a priority is associated for each piece of notification method information indicating a facsimile reception notification method, a determining unit configured to determine a facsimile reception notification method that the transfer target image forming device is caused to execute based on the executable notification method information and the notification priority information, a notification method information notifier configured to notify the transfer target image forming device of notification method information indicating the determined facsimile reception notification method, and a print instructor configured to instruct the transfer target image forming device to print the facsimile after the notification of the notification method information. The transfer target image forming device includes a first notification executor configured to execute the facsimile reception notification method indicated in the notification method information notified by the information processing device, and a print executor configured to execute printing of the facsimile instructed by the information processing device.

According to another embodiment, there is provided an information processing device that includes a facsimile obtaining unit configured to obtain a facsimile received by a facsimile device; a specifying unit configured to specify a transfer target image forming device as a target of a transfer of the facsimile among at least one image forming device; an executable notification method information obtaining unit configured to obtain, from the transfer target image forming device, executable notification method information indicating at least one facsimile reception notification method that is executable in the transfer target image forming device; a notification priority information obtaining unit configured to obtain notification priority information in which priority information indicating a priority is associated for each piece of notification method information indicating a facsimile reception notification method; a determining unit configured to determine a facsimile reception notification method that the transfer target image forming device is caused to execute based on the executable notification method information and the notification priority information; a notification method information notifier configured to notify the transfer target image forming device of notification method information indicating the determined facsimile reception notification method; and a print instructor configured to instruct the transfer target image forming device to print the facsimile after the notification of the notification method information.

According to still another embodiment, there is provided a non-transitory computer-readable storage medium with an executable program stored thereon and executed by a computer. The program instructs the computer to perform obtaining a facsimile received by a facsimile device; specifying a transfer target image forming device as a target of a transfer of the facsimile among at least one image forming device; obtaining, from the transfer target image forming device, executable notification method information indicating at least one facsimile reception notification method that is executable in the transfer target image forming device; obtaining notification priority information in which priority information indicating a priority is associated for each piece of notification method information indicating a facsimile reception notification method; determining a facsimile reception notification method that the transfer target image forming device is caused to execute based on the executable notification method information and the notification priority information; notifying the transfer target image forming device of notification method information indicating the determined facsimile reception notification method; and instructing the transfer target image forming device to print the facsimile after the notification of the notification method information.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 7 illustrates an example of transfer information according to the first embodiment;

FIG. 8 illustrates an example of executable notification method information according to the first embodiment;

FIG. 14 illustrates an example of a confirmation screen according to the second embodiment;

FIG. 17 illustrates an example of notification priority information according to the second embodiment; and FIG. 18 illustrates another example of the notification priority information according to the second embodiment.

DETAILED DESCRIPTION OF THE PREFERRED EMBODIMENTS

Exemplary embodiments of a facsimile system, an information processing device, and a storage medium according to the present invention will be explained in detail below with reference to the accompanying drawings.

First Embodiment

Figure 1:
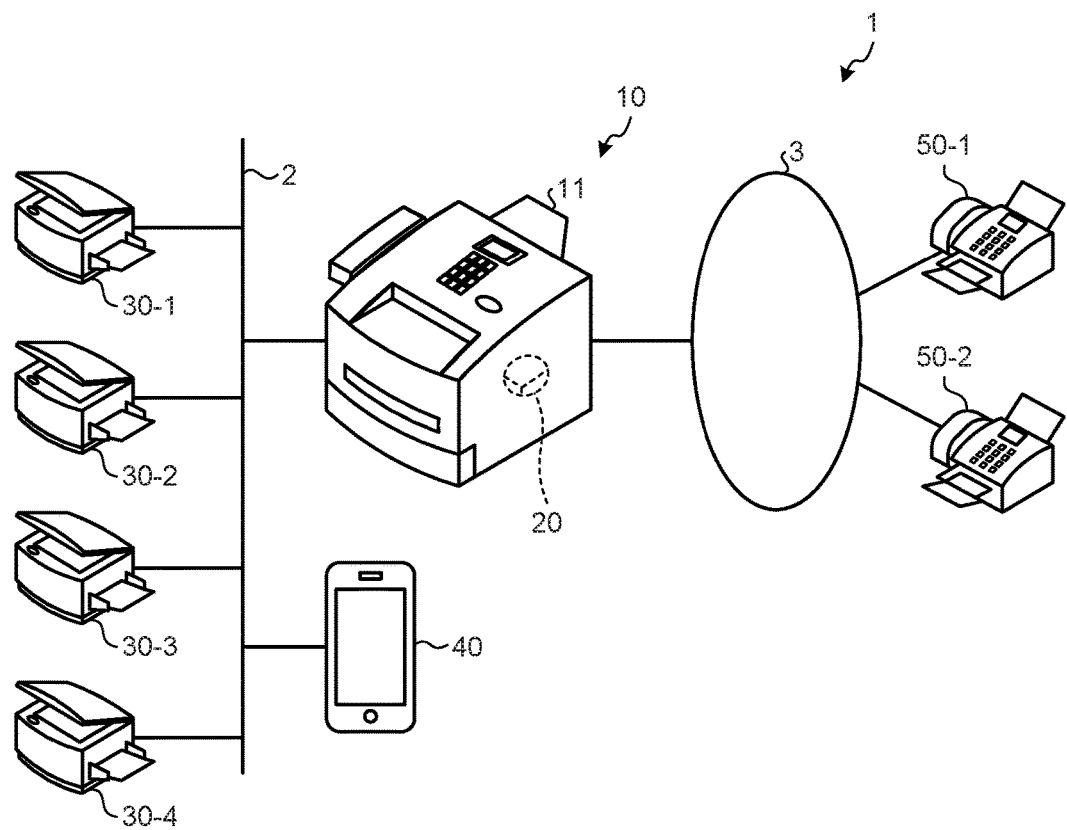
FIG. 1 is a view of a frame format of an example of a configuration of a facsimile system according to a first embodiment.

FIG. 1 is a view of a frame format of an example of a configuration of a facsimile system 1 according to a first embodiment. As illustrated in FIG. 1, the facsimile system 1 is provided with a base unit 10, subsidiary units 30-1 to 30-4 (an example of at least one image forming device), a portable terminal 40, and external facsimile devices 50-1 and 50-2. The base unit 10, the subsidiary units 30-1 to 30-4, and the portable terminal 40 are connected via an internal network 2, and the base unit 10 and the external facsimile devices 50-1 and 50-2 are connected via an external network 3.

The internal network 2, which is a private network, can be a LAN (Local Area Network), for example. The external network 3, which is a public network, can be a public network or the Internet, for example. While the first embodiment will be explained by taking a case where the external network 3 is a public network as an example, the present invention is not limited thereto.

In the explanation below, the subsidiary units 30-1 to 30-4 are sometimes referred to simply as subsidiary unit 30 without a necessity of discriminating them and the external facsimile devices 50-1 and 50-2 are sometimes referred to simply as external facsimile device 50 without a necessity of discriminating them. While a case where the number of the subsidiary units 30 is four is illustrated in FIG. 1, the present invention is not limited thereto and the number not less than one may be arbitrarily set. Similarly, while a case where the number of the external facsimile devices 50 is two is illustrated in FIG. 1, the present invention is not limited thereto and the number not less than one may be arbitrarily set.

The subsidiary unit 30, which is a device connected to the internal network 2 to which the base unit 10 is connected, can be an image forming device such as a printer, a copying machine, and an MFP (Multifunction Peripheral).

The portable terminal 40, which is a terminal device carried by a user, can be a smart device such as a smart phone and a tablet terminal.

The base unit 10 is a facsimile device connected to the external network 3. The facsimile device is required to include at least a facsimile function and can be a device whose main function is the facsimile function, a telephone set including the facsimile function, and a multifunction peripheral including the facsimile function.

In the first embodiment, the base unit 10 is provided with a main body unit 11 (an example of a facsimile device) and a server unit 20 (an example of an information processing device). A configuration of the base unit 10 as a facsimile device is provided in the main body unit 11 and an operation of the base unit 10 as a facsimile device is executed in the main body unit 11.

While the server unit 20, which is a small server of a board shape, is assumed to be embedded in the base unit 10 and internally connected to the main body unit 11 in the first embodiment, the present invention is not limited thereto. It is only necessary that the server unit 20 is connected to the main body unit 11 regardless of an internal connection and an external connection to the main body unit 11.

The server unit 20 transfers, to the subsidiary unit 30, a facsimile that the main body unit 11 receives from the external facsimile device 50 via the external network 3. Even a subsidiary unit 30 which is not connected to the external network 3 is thus configured to be capable of externally receiving a facsimile.

Figure 2:
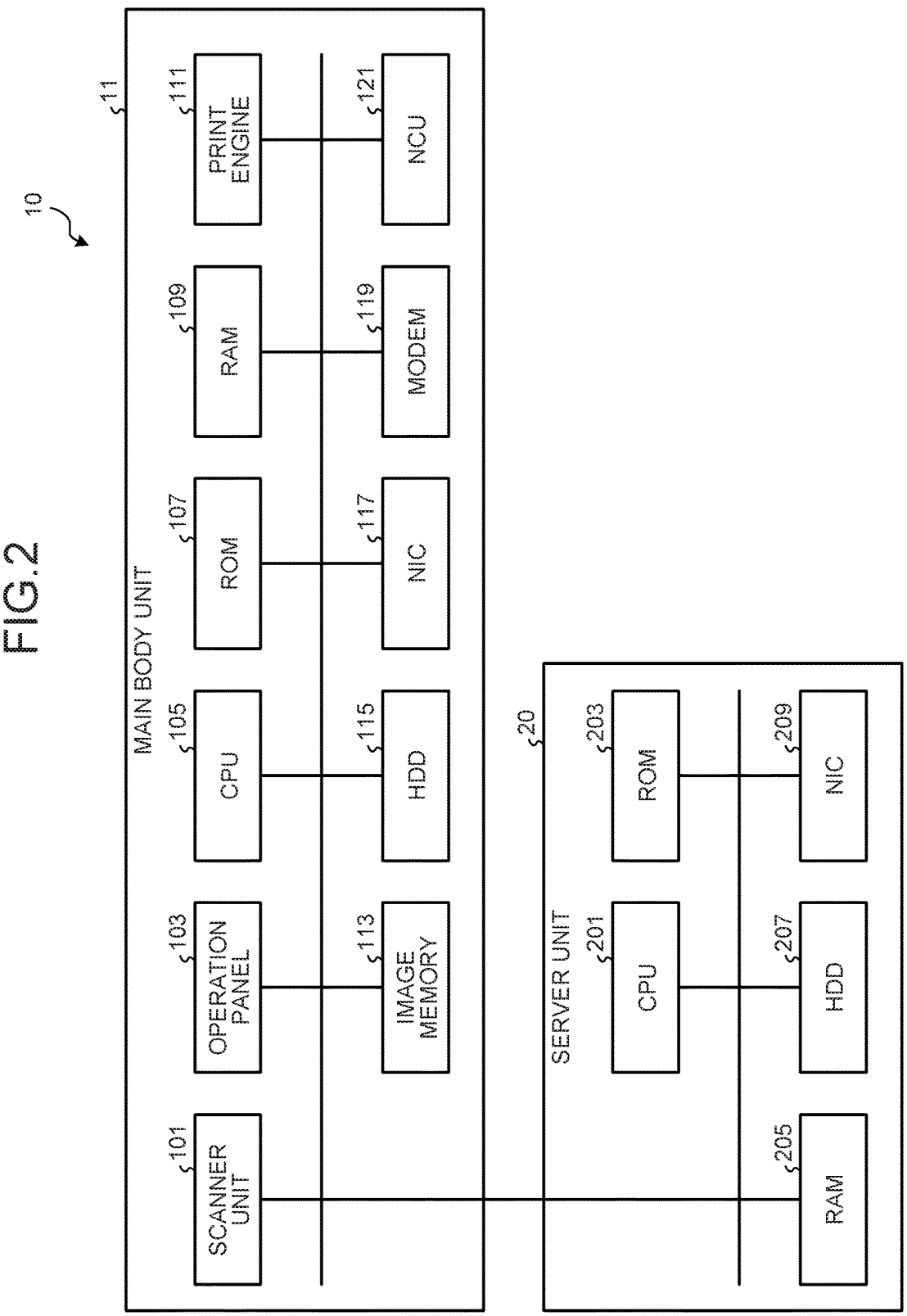
FIG. 2 is a block diagram of an example of a hardware configuration of a base unit according to the first embodiment.

FIG. 2 is a block diagram of an example of a hardware configuration of the base unit 10 according to the first embodiment. As illustrated in FIG. 2, the main body unit 11 and the server unit 20 of the base unit 10 are connected via a bus. The main body unit 11 is provided with a scanner unit 101, an operation panel 103, a CPU (Central Processing Unit) 105, a ROM (Read Only Memory) 107, a RAM (Random Access Memory) 109, a print engine 111, an image memory 113, an HDD (Hard Disk Drive) 115, a NIC (Network Interface Controller) 117, a MODEM 119, and an NCU (Network Control Unit) 121. The server unit 20 is provided with a CPU 201, a ROM 203, a RAM 205, an HDD 207, and a NIC 209. However, the hardware configuration of the base unit 10 illustrated in FIG. 2 is only one example and the present invention is not limited thereto.

The scanner unit 101 electronically scans a document placed on a document table to generate image data. The print engine 111 outputs the image data for printing. The image memory 113 is a memory that stores the image data generated by the scanner unit 101 and the image data output for printing by the print engine 111.

The NIC 117 is a communication interface for communication via the internal network 2. The NCU 121 is a communication interface for communication via the external network 3. The MODEM 119 is a device that performs a modulation and a demodulation associated with a facsimile communication via the external network 3. The operation panel 103, which is provided with an LCD (Liquid Crystal Display) that displays a screen, an LED (Light Emitting Diode) that indicates a status, a buzzer, a hardware key, and a touch-sensitive panel, displays information of various kinds in the LCD and receives inputs of information of various kinds from the hardware key and the touch-sensitive panel.

The ROM 107 stores programs to be executed in the CPU 105 and the like. The RAM 109 is used as a work area of the CPU 105. The HDD 115 stores data of various kinds used by the CPU 105. The CPU 105 executes the programs stored in the ROM 107 on the RAM 109 to control the scanner unit 101, the operation panel 103, the print engine 111, the image memory 113, the HDD 115, the NIC 117, the MODEM 119, and the NCU 121, which are connected via the bus.

The NIC 209 is a communication interface for communication via the internal network 2. The ROM 203 stores programs to be executed in the CPU 201 and the like. The RAM 205 is used as a work area of the CPU 201. The HDD 207 stores data of various kinds used by the CPU 201. The CPU 201 executes the programs stored in the ROM 203 on the RAM 205 to realize a facsimile communication in cooperation with the main body unit 11 and the subsidiary unit 30.

Figure 3:
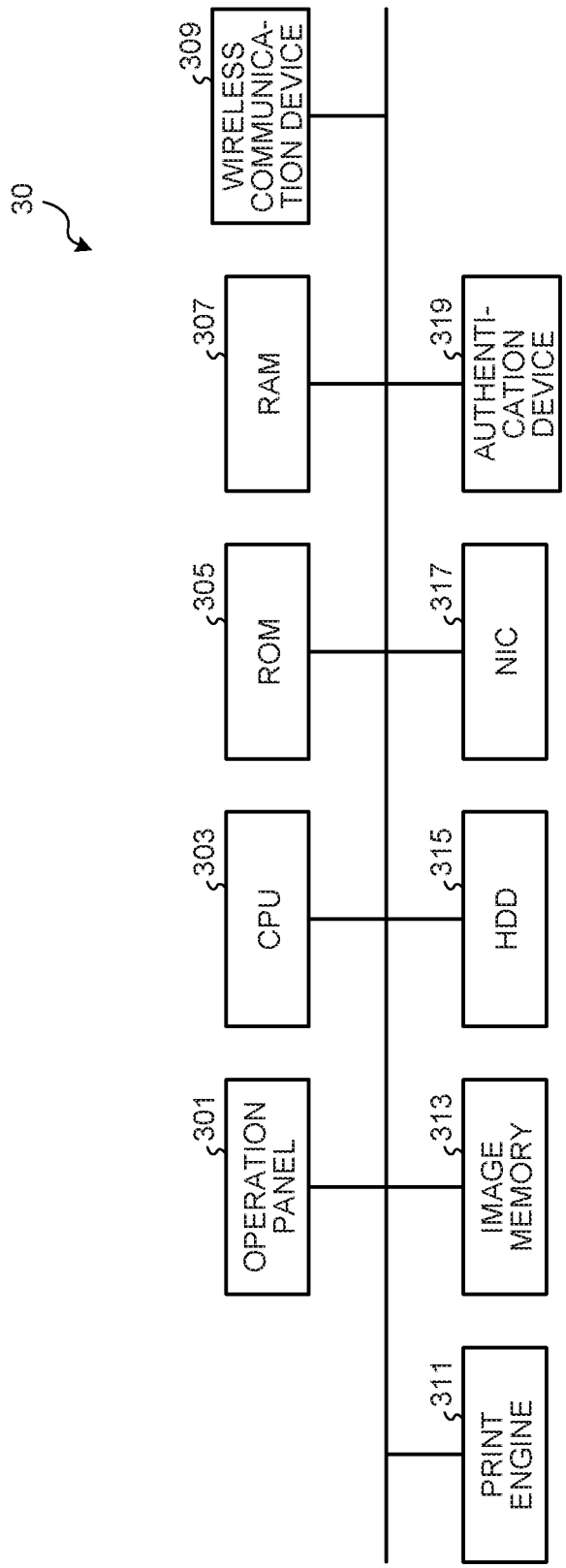
FIG. 3 is a block diagram of an example of a hardware configuration of a subsidiary unit according to the first embodiment.
Figure 4:
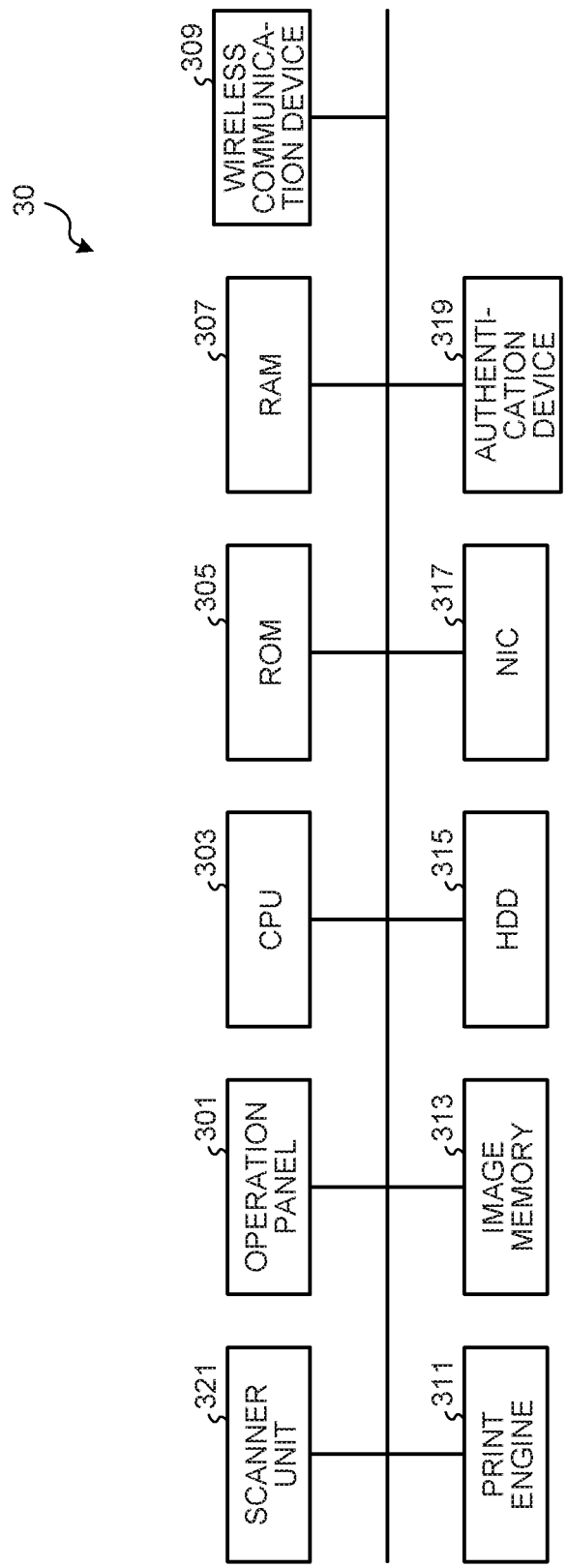
FIG. 4 is a block diagram of another example of a hardware configuration of the subsidiary unit according to the first embodiment.

FIGS. 3 and 4 are block diagrams of examples of hardware configurations of the subsidiary unit 30 according to the first embodiment. FIG. 3 illustrates a hardware configuration in a case where the subsidiary unit 30 is a printer and FIG. 4 illustrates a hardware configuration in a case where the subsidiary unit 30 is a multifunction peripheral. Since the difference between the hardware configuration illustrated in FIG. 3 and the hardware configuration illustrated in FIG. 4 is a presence or an absence of a scanner unit 321, the hardware configuration with the scanner unit 321 illustrated in FIG. 4 is taken as an example here and explained. As for the hardware configuration illustrated in FIG. 3, it is only necessary to eliminate the scanner unit 321 from the explanation to be made below.

As illustrated in FIG. 4, the subsidiary unit 30 is provided with an operation panel 301, a CPU 303, a ROM 305, a RAM 307, a wireless communication device 309, a print engine 311, an image memory 313, an HDD 315, an NIC 317, an authentication device 319, and the scanner unit 321. Here, the hardware configuration of the subsidiary unit 30 illustrated in FIG. 4 is just an example and the present invention is not limited thereto.

The scanner unit 321 electronically scans a document placed on a document table to generate image data. The print engine 311 outputs the image data for printing. The image memory 313 stores the image data generated by the scanner unit 321 and the image data output by the print engine 311 for printing.

The NIC 317 is a communication interface for communication via the internal network 2. The wireless communication device 309 is a communication interface for near field communication such as the Bluetooth®. The authentication device 319 is a device such as a card reader that authenticates users. The operation panel 301, which is provided with an LCD for displaying a screen, an LED that indicates a status, a buzzer, a PATLITE®, a hardware key, and a touch-sensitive panel, displays information of various kinds in the LCD and receives inputs of information of various kinds from the hardware key and the touch-sensitive panel.

The ROM 305 stores programs to be executed in the CPU 303 and the like. The RAM 307 is used as a work area of the CPU 303. The HDD 315 stores data of various kinds used by the CPU 303. The CPU 303 executes the programs stored in the ROM 305 on the RAM 307 to control the operation panel 301, the wireless communication device 309, the print engine 311, the image memory 313, the HDD 315, the NIC 317, the authentication device 319, the scanner unit 321, and the like, which are connected via a bus.

Figure 5:
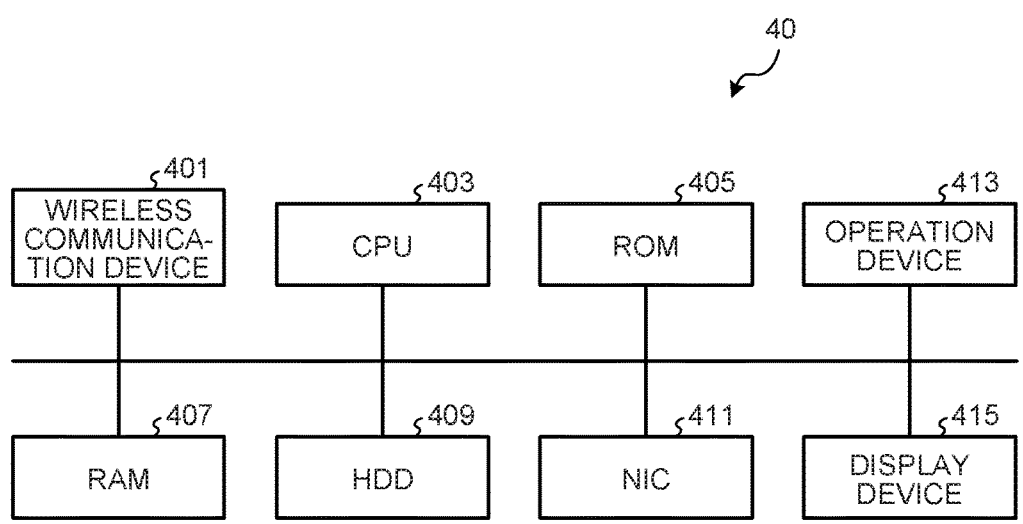
FIG. 5 is a block diagram of an example of a hardware configuration of a portable terminal according to the first embodiment.

FIG. 5 is a block diagram of an example of a hardware configuration of the portable terminal 40 according to the first embodiment. As illustrated in FIG. 5, the portable terminal 40 is provided with a wireless communication device 401, a CPU 403, a ROM 405, a RAM 407, an HDD 409, a NIC 411, an operation device 413, and a display device 415. Here, the hardware configuration of the portable terminal 40 illustrated in FIG. 5 is just an example and the present invention is not limited thereto.

The NIC 411 is a communication interface for communication via the internal network 2. The wireless communication device 401 is a communication interface for near field communication such as the Bluetooth®. The operation device 413 is, for example, a touch-sensitive panel that enables operational inputs of various kinds. The display device 415 displays information of various kinds.

The ROM 405 stores programs to be executed in the CPU 403 and the like. The RAM 407 is used as a work area of the CPU 403. The HDD 409 stores data of various kinds used by the CPU 403. The CPU 403 executes the programs stored in the ROM 405 on the RAM 407 to realize various kinds of operations.

Figure 6:
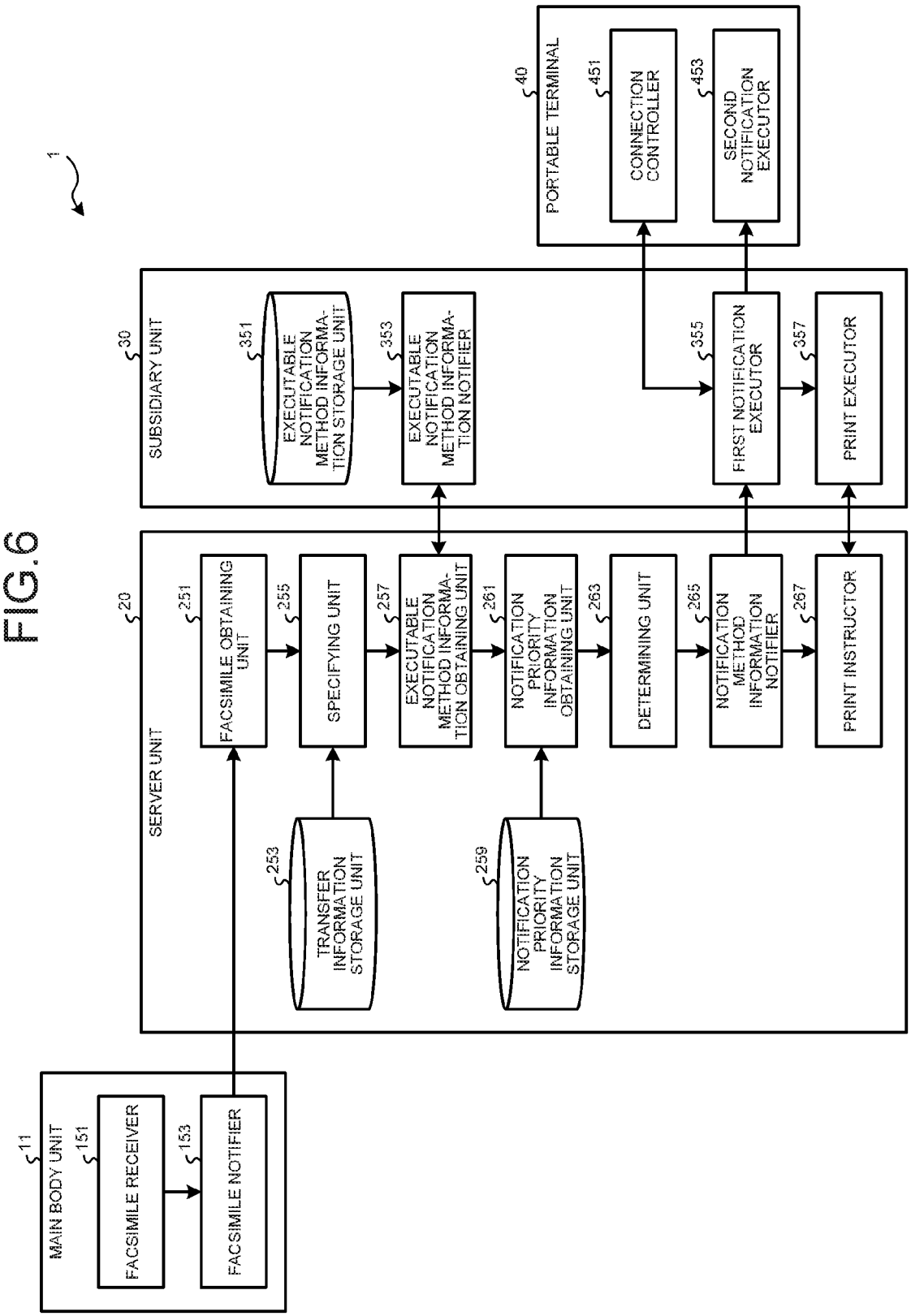
FIG. 6 is a block diagram of an example of a functional configuration of a facsimile system according to the first embodiment.

FIG. 6 is a block diagram of an example of a functional configuration of the facsimile system 1 according to the first embodiment. As illustrated in FIG. 6, the main body unit 11 is provided with a facsimile receiver 151 and a facsimile notifier 153. The facsimile receiver 151 can be realized by the CPU 105, the RAM 109, the MODEM 119, and the NCU 121 and the facsimile notifier 153 can be realized by the CPU 105, the RAM 109, and the NIC 117, for example.

As illustrated in FIG. 6, the server unit 20 is provided with a facsimile obtaining unit 251, a transfer information storage unit 253, an specifying unit 255, an executable notification method information obtaining unit 257, a notification priority information storage unit 259, a notification priority information obtaining unit 261, a determining unit 263, a notification method information notifier 265, and a print instructor 267.

The facsimile obtaining unit 251, the specifying unit 255, the notification priority information obtaining unit 261, and the determining unit 263 can be realized by the CPU 201 and the RAM 205, the transfer information storage unit 253 and the notification priority information storage unit 259 can be realized by the HDD 207, and the executable notification method information obtaining unit 257, the notification method information notifier 265, and the print instructor 267 can be realized by the CPU 201, the RAM 205, and the NIC 209, for example.

As illustrated in FIG. 6, the subsidiary unit 30 is provided with an executable notification method information storage unit 351, an executable notification method information notifier 353, a first notification executor 355, and a print executor 357. The executable notification method information storage unit 351 can be realized by the HDD 315, the executable notification method information notifier 353 can be realized by the CPU 303, the RAM 307, and the NIC 317, the first notification executor 355 can be realized by the CPU 303, the RAM 307, and the wireless communication device 309, and the print executor 357 can be realized by the print engine 311, for example.

As illustrated in FIG. 6, the portable terminal 40 is provided with a connection controller 451 and a second notification executor 453. The connection controller 451 and the second notification executor 453 can be realized by the wireless communication device 401, the CPU 403, and the RAM 407, for example.

The facsimile receiver 151 receives a facsimile from the external facsimile device 50 via the external network 3.

The facsimile notifier 153 notifies the server unit 20 of the facsimile received by the facsimile receiver 151.

The facsimile obtaining unit 251 obtains the facsimile from the main body unit 11.

The transfer information storage unit 253 stores transfer information with which a destination of a transfer of the facsimile obtained by the facsimile obtaining unit 251 is determined. FIG. 7 illustrates an example of transfer information according to the first embodiment. In the example illustrated in FIG. 7, transfer information includes information in which a facsimile number as a source of transmission and a subsidiary unit address as a destination of transfer are associated. The facsimile number as a source of transmission is a facsimile number of a transmission source such as the external facsimile device 50 that transmits a facsimile to the main body unit 11, and the subsidiary unit address as a transfer destination is, for example, an IP address of the subsidiary unit 30.

The specifying unit 255 specifies a subsidiary unit 30 as a target of the transfer of the facsimile obtained by the facsimile obtaining unit 251 among the at least one subsidiary unit 30. Specifically, the specifying unit 255 refers to transfer information stored in the transfer information storage unit 253 to specify the subsidiary unit 30 as the transfer target of the facsimile obtained by the facsimile obtaining unit 251.

For example, when the facsimile number as the transmission source of the facsimile obtained by the facsimile obtaining unit 251 is "03xxxxxxxx", a subsidiary unit 30 whose transfer destination address is "11.22.33.44" is specified as the transfer target of the facsimile obtained by the facsimile obtaining unit 251 with reference to the transfer information illustrated in FIG. 7.

The executable notification method information obtaining unit 257 obtains executable notification method information indicating at least one facsimile reception notification method which is executable in the subsidiary unit 30 as the transfer target from the subsidiary unit 30 as the transfer target specified by the specifying unit 255.

The executable notification method information storage unit 351 stores executable notification method information of the subsidiary unit 30. When requested by the server unit 20 for an obtainment of executable notification method information, the executable notification method information notifier 353 obtains executable notification method information from the executable notification method information storage unit 351 and passes the information to the server unit 20.

FIG. 8 illustrates an example of executable notification method information according to the first embodiment. In the example illustrated in FIG. 8, the executable notification method information indicates that a notification to a smart device, a notification via lighting of an LED lamp, and a notification via a dialog display are available.

Figures 9, 10:
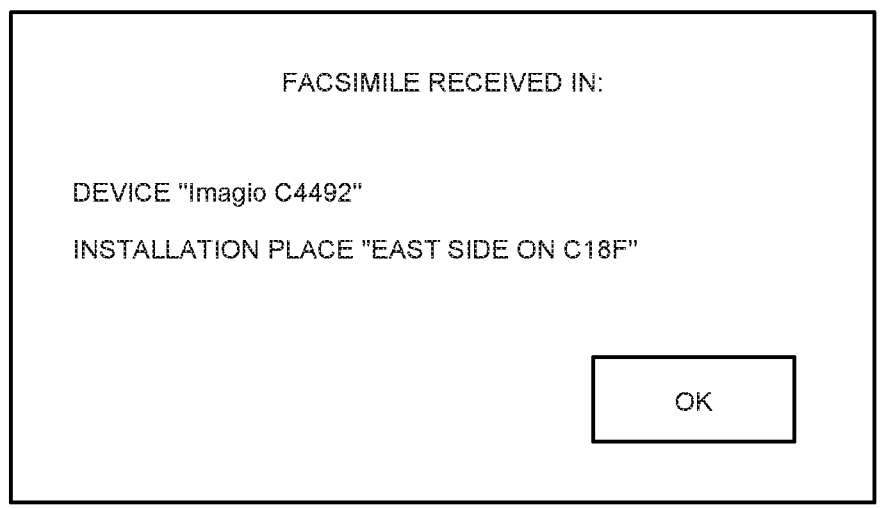
FIG. 9 illustrates an example of notification priority information according to the first embodiment.
FIG. 10 illustrates an example of a screen display according to the first embodiment.

The notification priority information storage unit 259 stores notification priority information in which priority information indicating a priority is associated for each piece of notification method information indicating a facsimile reception notification method. FIG. 9 illustrates an example of notification priority information according to the first embodiment. In the example illustrated in FIG. 9, the notification priority information indicates that the notification to a smart device is of the highest priority and the notification via the dialogue display, a notification via a beep sound, the notification via lighting of the LED lamp, and a notification via the PATLITE® are arranged in order of priority from high to low.

The notification priority information obtaining unit 261 obtains the notification priority information. Specifically, the notification priority information obtaining unit 261 obtains the notification priority information from the notification priority information storage unit 259.

The determining unit 263 determines a facsimile reception notification method that the subsidiary unit 30 as the transfer target specified by the specifying unit 255 is caused to execute based on the executable notification method information obtained by the executable notification method information obtaining unit 257 and the notification priority information obtained by the notification priority information obtaining unit 261. Specifically, the determining unit 263 refers to the notification priority information and determines, as the facsimile reception notification method that the subsidiary unit 30 as the transfer target is caused to execute, an executable notification method whose priority is the highest among the at least one executable notification method indicated in the executable notification method information.

For example, in the case of the executable notification method information illustrated in FIG. 8 and the notification priority information illustrated in FIG. 9, the facsimile reception notification method that the subsidiary unit 30 as the transfer target is caused to execute is determined to be the notification to a smart device.

The notification method information notifier 265 notifies the subsidiary unit 30 as the transfer target specified by the specifying unit 255 of notification method information indicating the facsimile reception notification method determined by the determining unit 263.

When the executable notification method information obtaining unit 257 fails to obtain the executable notification method information from the subsidiary unit 30 as the transfer target, the notification method information notifier 265 may notify a predetermined notification destination of facsimile reception notification information that indicates that the facsimile is transferred to the subsidiary unit 30 as the transfer target. The predetermined notification destination can be, for example, a mail address of an administrator or any of the subsidiary unit 30.

The first notification executor 355 executes the facsimile reception notification method indicated in the notification method information notified from the server unit 20. For example in the case where the notification method information indicates the dialogue display, the first notification executor 355 displays a screen to the effect that a facsimile is received in the operation panel 301 (LCD). Besides, in the case where the notification method information indicates the notification via beep sound, the first notification executor 355 causes the operation panel 301 (buzzer) to output a beep sound, for example. In addition, in the case where the notification method information indicates the notification via lighting of the LED, the first notification executor 355 turns on the operation panel 301 (LED), for example. Moreover, in the case where the notification method information indicates the notification via lighting of the PATLITE®, the first notification executor 355 turns on the operation panel 301 (PATLITE®), for example.

While it is assumed in the first embodiment that the first notification executor 355 displays a screen to the effect that a facsimile is transferred to the subsidiary unit 30 as the transfer target in the operation panel 301 (LCD) as illustrated in FIG. 10 in receiving the facsimile reception notification information from the server unit 20, the present invention is not limited thereto.

As explained already, in the case of the executable notification method information illustrated in FIG. 8 and the notification priority information illustrated in FIG. 9, the determining unit 263 determines the notification to a smart device as the facsimile reception notification method that the subsidiary unit 30 as the transfer target is caused to execute. In this case, since the notification method information indicates the notification to a smart device, when the portable terminal 40 comes to locate within a predetermined range after the notification of the notification method information from the server unit 20, the first notification executor 355 tries to make a connection to the portable terminal 40 and notifies, when the connection succeeds, the portable terminal 40 of notification method information for portable terminal indicating the facsimile reception notification method of the portable terminal 40.

When the connection to the portable terminal 40 succeeds, the first notification executor 355 may check whether or not to have ever made a connection to the portable terminal 40 in the past based on an identifier such as a serial number or a MAC (Media Access Control) address of the portable terminal 40, and may notify the portable terminal 40 of the notification method information for portable terminal when the connection has ever been made in the past.

The connection controller 451 tries to make a connection to the subsidiary unit 30 as the transfer target when the subsidiary unit 30 as the transfer target comes to locate within the predetermined range with a movement of a user who retains the portable terminal 40.

The second notification executor 453 executes a facsimile reception notification method for portable terminal indicated in the notification method information for portable terminal notified by the subsidiary unit 30 as the transfer target when the connection to the subsidiary unit 30 as the transfer target succeeds.

While a message display in the display device 415 is assumed for the facsimile reception notification method for portable terminal indicated in the notification method information for portable terminal in the first embodiment, the present invention is not limited thereto and a vibration, an audio output of a ring alert, and the like may be used.

The print instructor 267 instructs the subsidiary unit 30 as the transfer target to print the facsimile after the notification of the notification method information by the notification method information notifier 265.

The print executor 357 executes the facsimile printing instructed by the server unit 20.

Figure 11:
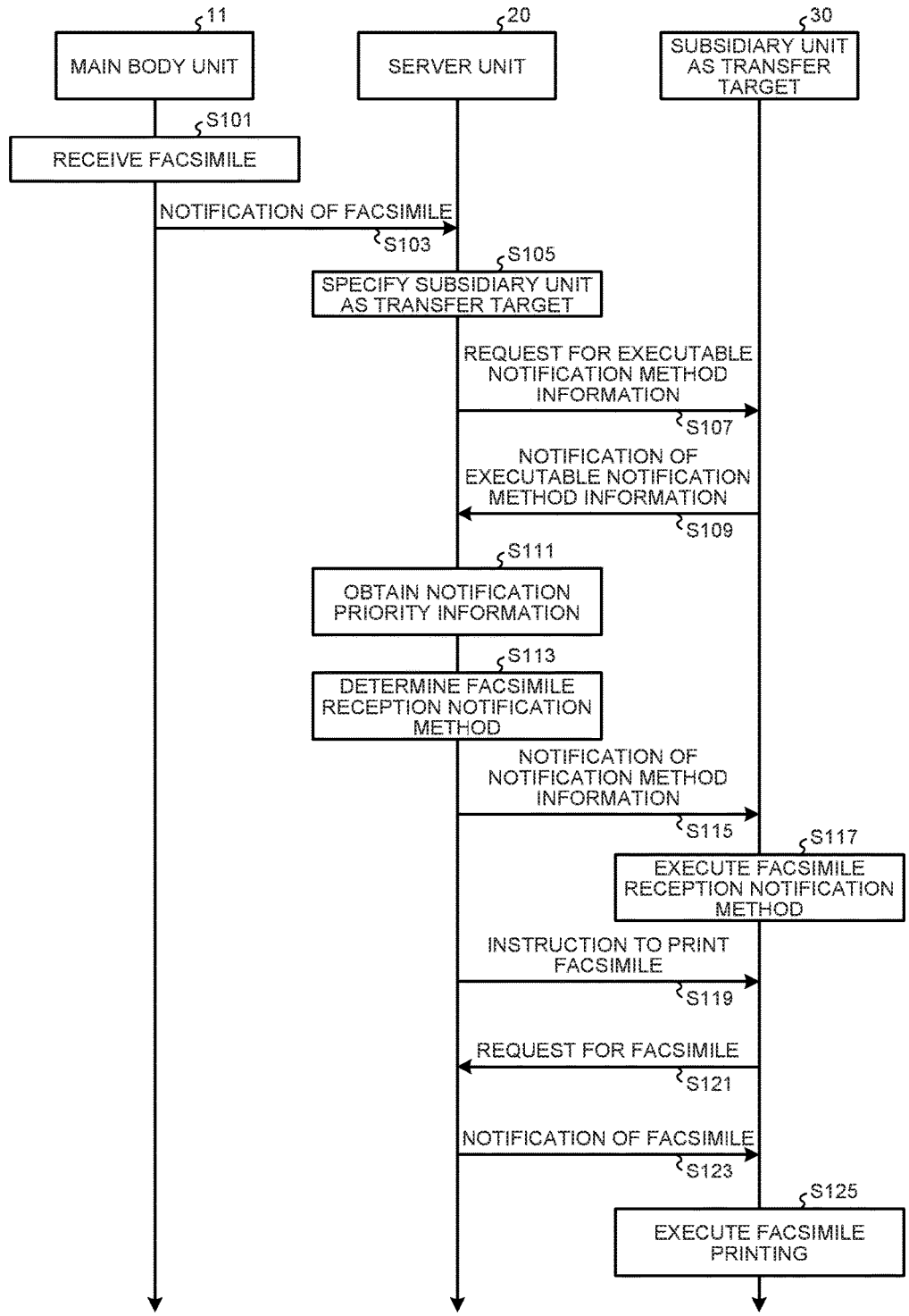
FIG. 11 is a sequence diagram of an example of a flow of a procedure of a processing to be performed in the facsimile system according to the first embodiment.

FIG. 11 is a sequence diagram of an example of a flow of a procedure of a processing to be performed in the facsimile system 1 according to the first embodiment.

First, the facsimile receiver 151 of the main body unit 11 receives a facsimile from the external facsimile device 50 via the external network 3 (step S101).

The facsimile notifier 153 of the main body unit 11 then notifies the server unit 20 of the facsimile received by the facsimile receiver 151 and the facsimile obtaining unit 251 of the server unit 20 obtains the facsimile from the main body unit 11 (step S103).

The specifying unit 255 of the server unit 20 then refers to transfer information stored in the transfer information storage unit 253 to specify a subsidiary unit 30 as a target of the transfer of the facsimile obtained by the facsimile obtaining unit 251 (step S105).

The executable notification method information obtaining unit 257 of the server unit 20 requests the subsidiary unit 30 as the transfer target specified by the specifying unit 255 to obtain executable notification method information (step S107), and the executable notification method information notifier 353 of the subsidiary unit 30 as the transfer target obtains executable notification method information from the executable notification method information storage unit 351 and notifies the server unit 20 when requested by the server unit 20 to obtain the executable notification method information (step S109).

The notification priority information obtaining unit 261 of the server unit 20 then obtains notification priority information from the notification priority information storage unit 259 (step S111).

The determining unit 263 of the server unit 20 then determines the facsimile reception notification method that the subsidiary unit 30 as the transfer target specified by the specifying unit 255 is caused to execute based on the executable notification method information obtained by the executable notification method information obtaining unit 257 and the notification priority information obtained by the notification priority information obtaining unit 261 (step S113).

The notification method information notifier 265 of the server unit 20 then notifies the subsidiary unit 30 as the transfer target specified by the specifying unit 255 of the notification method information indicating the facsimile reception notification method determined by the determining unit 263 (step S115).

The first notification executor 355 of the subsidiary unit 30 as the transfer target then executes the facsimile reception notification method indicated in the notification method information notified by the server unit 20 (step S117).

The print instructor 367 of the server unit 20 then instructs the subsidiary unit 30 as the transfer target to print the facsimile after the notification of the notification method information by the notification method information notifier 265 (step S119).

The print executor 357 of the subsidiary unit 30 as the transfer target then requests the server unit 20 for the facsimile as a target of printing, the print instructor 267 transmits the facsimile as the print target to the subsidiary unit 30 as the transfer target, and the print executor 357 executes the printing of the facsimile transmitted from the server unit 20 (steps S121 to S125).

Figure 12:
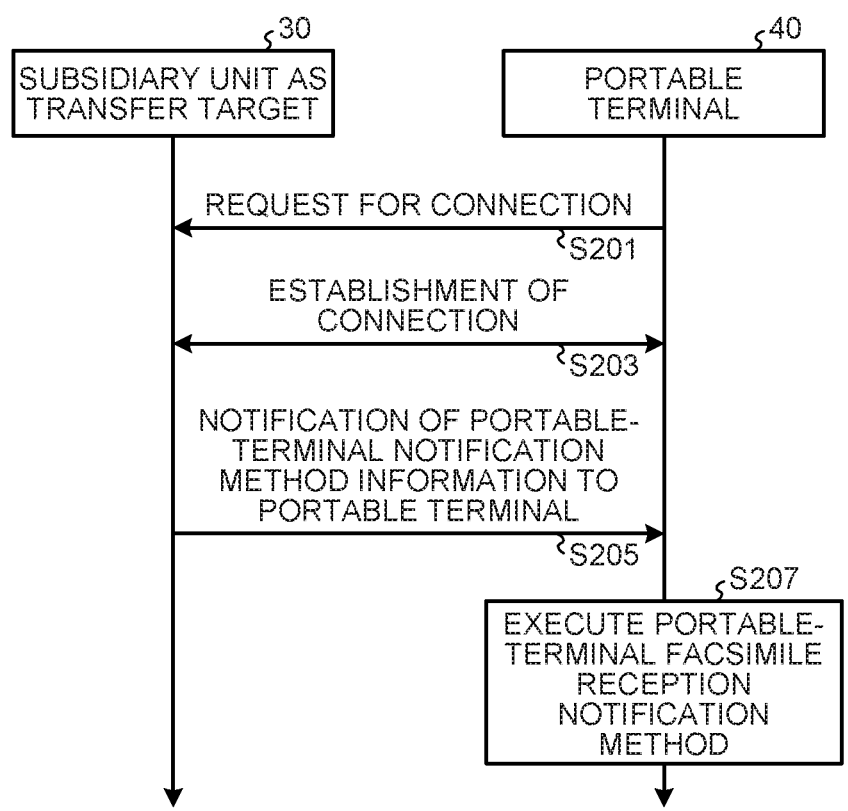
FIG. 12 is a sequence diagram of an example of a flow of a procedure of a processing to be performed when the notification method information indicates a notification to a smart device in the facsimile system according to the first embodiment.

FIG. 12 is a sequence diagram of an example of a flow of a procedure of a processing to be performed when the notification method information indicates the notification to a smart device in the facsimile system 1 according to the first embodiment.

First, when detecting that a subsidiary unit 30 (a subsidiary unit 30 as a transfer target is assumed here) comes to locate within a predetermined range in association with a movement of a user who retains the portable terminal 40, the connection controller 451 of the portable terminal 40 requests the subsidiary unit 30 as the transfer target for connection (step S201).

When requested by the portable terminal 40 for connection, the first notification executor 355 of the subsidiary unit 30 as the transfer target establishes the connection between the subsidiary unit 30 as the transfer target and the portable terminal 40 in cooperation with the connection controller 451 of the portable terminal 40 (step S203).

When the connection is established, the first notification executor 355 then notifies the portable terminal 40 of the notification method information for portable terminal (step S205).

The second notification executor 453 of the portable terminal 40 then executes the facsimile reception notification method for portable terminal indicated in the notification method information for portable terminal notified by the subsidiary unit 30 as the transfer target (step S207).

As explained so far according to the first embodiment, the server unit instructs a subsidiary unit as a transfer target to which a facsimile is transferred about a notification method which is executable in the subsidiary unit and the subsidiary unit executes the notification method, so that a reception of the facsimile can be known to the surroundings.

Second Embodiment

In a second embodiment, an example of executing a facsimile printing based on an instruction by a user will be explained. A difference from the first embodiment will be explained mainly below, a constituent including the same function as the first embodiment will be assigned with the same name and the same reference symbol as the first embodiment, and the explanation thereof will be omitted here.

Figure 13:
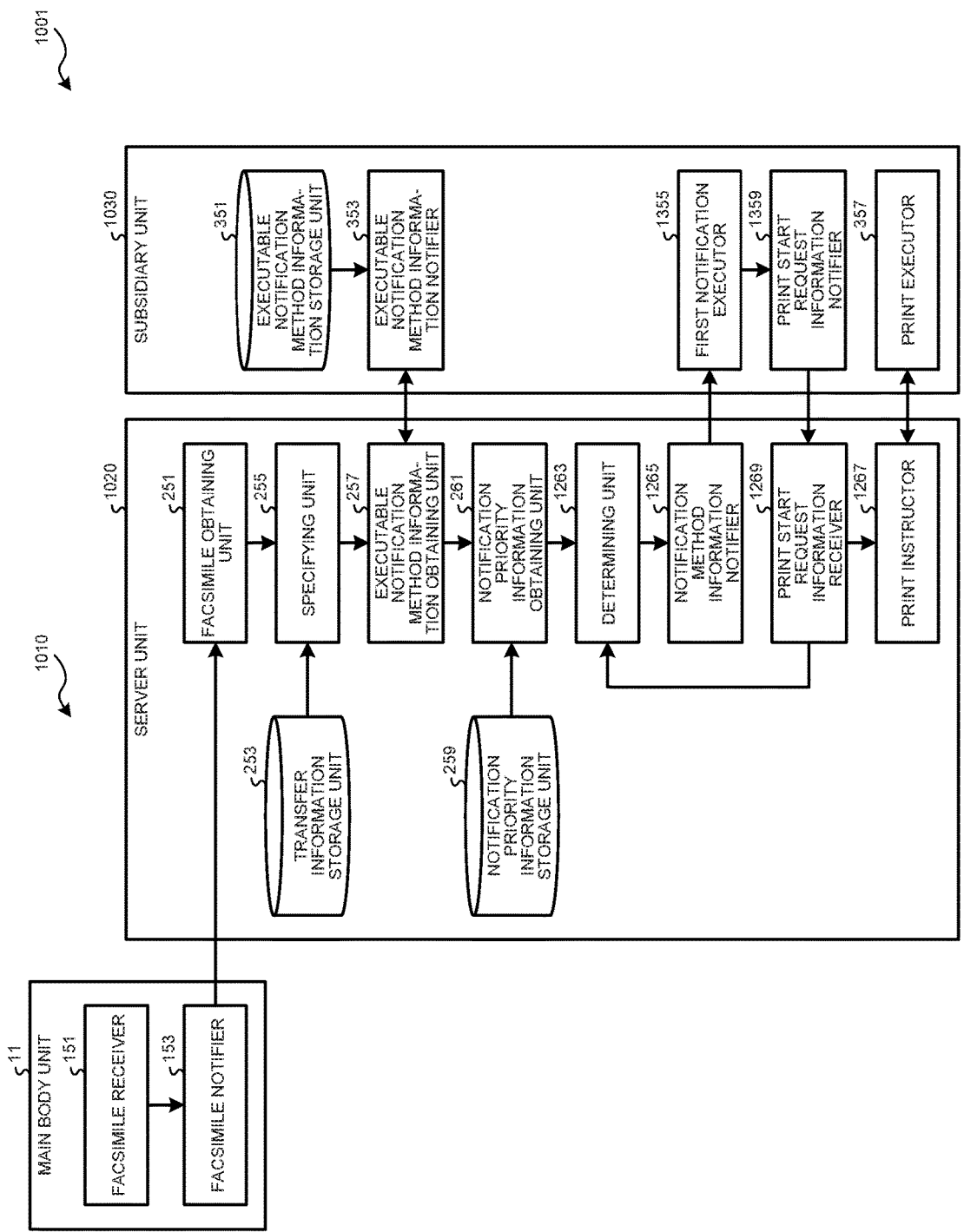
FIG. 13 is a block diagram of an example of a functional configuration of a facsimile system according to a second embodiment.

FIG. 13 is a block diagram of an example of a functional configuration of a facsimile system 1001 according to a second embodiment. As illustrated in FIG. 13, a server unit 1020 of a base unit 1010 according to the second embodiment is provided with a determining unit 1263, a notification method information notifier 1265, a print start request information receiver 1269, and a print instructor 1267, which are different from the first embodiment, and a subsidiary unit 1030 according to the second embodiment is provided with a first notification executor 1355 and a print start request information notifier 1359, which are different from the first embodiment.

The print start request information notifier 1359 notifies the server unit 1020 of print start request information indicating whether or not to start a facsimile printing based on an operational input by a user after the first notification executor 1355 executes the facsimile reception notification method indicated in the notification method information notified by the server unit 1020.

When the first notification executor 1355 executes the facsimile reception notification method, for example, the print start request information notifier 1359 displays a confirmation screen that urges a user to confirm whether or not to print the facsimile in the operation panel 301 (LCD) as illustrated in FIG. 14. When whether or not to print the facsimile is selected by the user with respect to the operation panel 301 (hardware key or a touch-sensitive panel), the print start request information notifier 1359 notifies the server unit 1020 of print start request information indicating whether or not to start the printing of the facsimile.

The print start request information receiver 1269 receives the print start request information notified by the subsidiary unit 1030 as the transfer target.

The print instructor 1267 instructs the subsidiary unit 1030 as the transfer target to print the facsimile when the print start request information received by the print start request information receiver 1269 indicates to start the printing.

When the print start request information is not received by the print start request information receiver 1269, the determining unit 1263 determines an auxiliary facsimile reception notification method that the subsidiary unit 1030 as the transfer target is further caused to execute among at least one facsimile reception notification method, except for the already-determined facsimile reception notification method, indicated in the executable notification method information based on the notification priority information. For example, it is only necessary that the determining unit 1263 determines, as an auxiliary facsimile reception notification method that the subsidiary unit 1030 as the transfer target is caused to execute, an executable notification method whose priority is the second highest among the at least one executable notification method indicated in the executable notification method information.

The notification method information notifier 1265 further notifies the subsidiary unit 1030 as the transfer target of auxiliary notification method information indicating the auxiliary facsimile reception notification method determined by the determining unit 1263.

The first notification executor 1355 further executes the auxiliary facsimile reception notification method indicated in the auxiliary notification method information notified by the server unit 1020.

Figure 15:
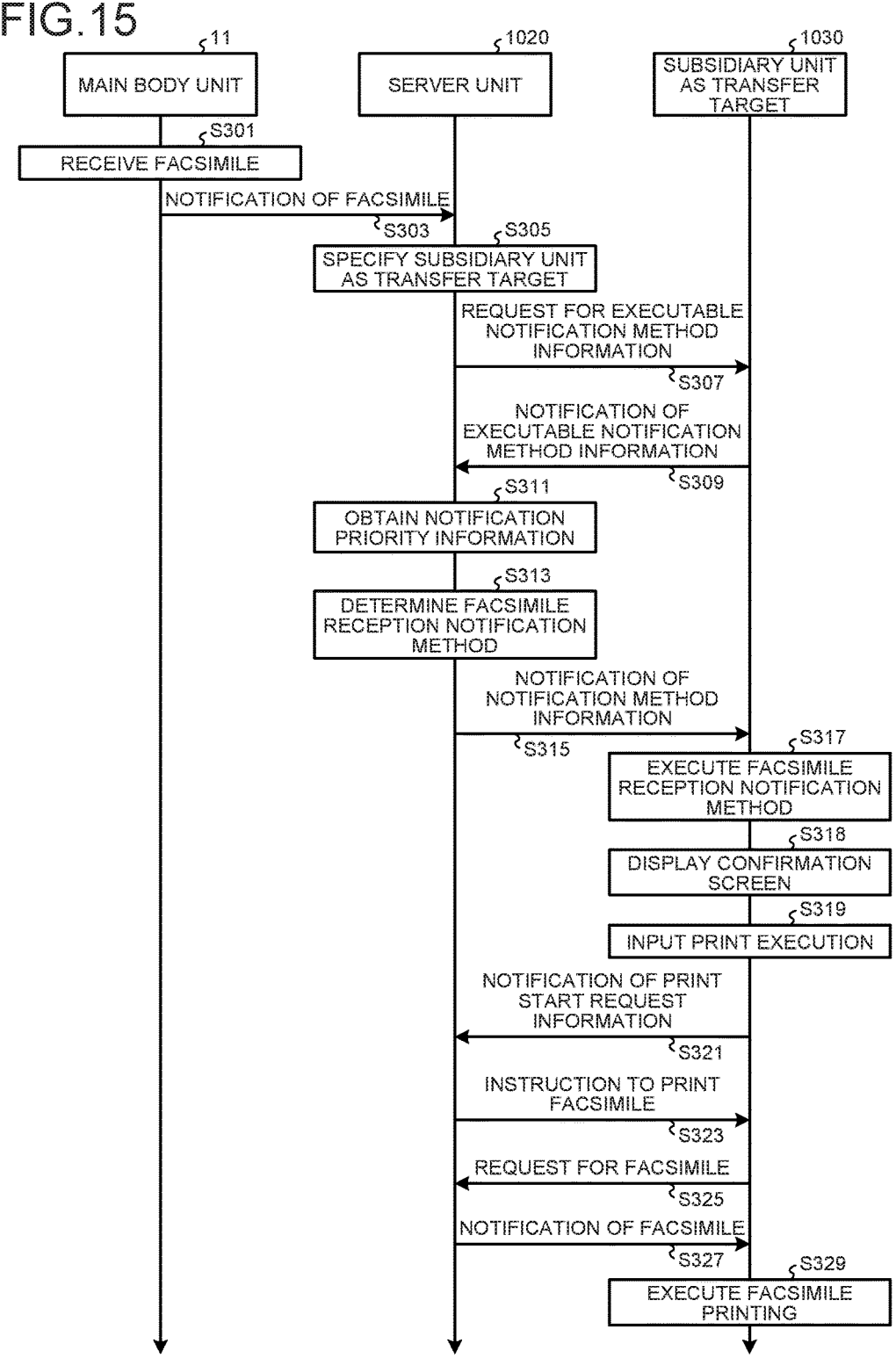
FIG. 15 is a sequence diagram of an example of a flow of a procedure of a processing to be performed in the facsimile system according to the second embodiment.

FIG. 15 is a sequence diagram of an example of a flow of a procedure of a processing to be performed in the facsimile system 1001 according to the second embodiment.

The processing at steps S301 to S317 is the same as the processing at steps S101 to S117 in the sequence diagram illustrated in FIG. 11.

When the first notification executor 1355 executes the facsimile reception notification method, the print start request information notifier 1359 of the subsidiary unit 1030 as the transfer target displays a confirmation screen that urges a user to confirm whether or not to print the facsimile in the operation panel 301 (LCD) (step S318).

The print start request information notifier 1359 of the subsidiary unit 1030 as the transfer target then receives an input of selecting an execution of the printing by the user with respect to the operation panel 301 (hardware key or touch-sensitive panel) (step S319) and notifies the server unit 1020 of the print start request information indicating a start of the printing of the facsimile, and the print start request information receiver 1269 of the server unit 1020 receives the print start request information notified by the subsidiary unit 1030 as the transfer target (step S321).

The print instructor 1267 then instructs the subsidiary unit 1030 as the transfer target to print the facsimile since the print start request information received by the print start request information receiver 1269 indicates to start the printing (step S323).

The subsequent processing at steps S325 to S329 is the same as the processing at steps S121 to S125.

First Modification

Figure 16:
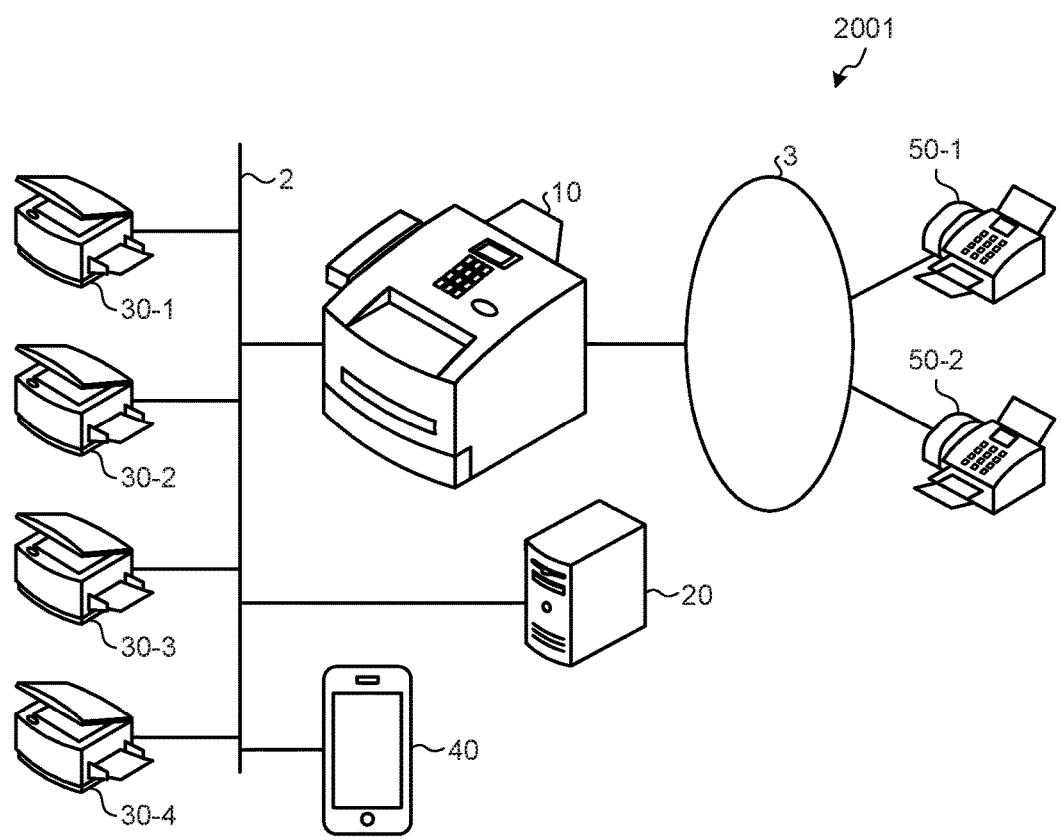
FIG. 16 is a view of a frame format of an example of a configuration of a facsimile system according to a first modification.

While the case where the server unit 20 is embedded in the base unit 10 and internally connected to the main body unit 11 is taken as an example and explained in the embodiments explained above, the server unit 20 may be connected from an outside of the base unit 10 to the network 2 like a facsimile system 2001 illustrated in FIG. 16 and may be connected to the base unit 10 via the network 2. In this case, the base unit 10 corresponds to the main body unit 11.

Second Modification

In the embodiments explained above, the notification priority information may be switched depending on conditions. For example, priority information may be associated with notification method information for each piece of time zone information indicating a time zone like the notification priority information illustrated in FIG. 17, and the determining unit may determine the facsimile reception notification method that the subsidiary unit as the transfer target is caused to execute further based on the current time.

Since the facsimile reception notification method determined by the determining unit differs depending on time zones with this configuration, it is possible to perform the most suitable notification of facsimile reception in both of a time zone during which the user is present and a time zone during with the user is absent and thereby to enhance a degree of certainty in making the user aware of the facsimile reception.

Moreover, priority information may be associated with the notification method information for each piece of user identifying information indicating a user like the notification priority information illustrated in FIG. 18, and the determining unit may determine the facsimile reception notification method that the subsidiary unit as the transfer target is caused to execute further based on reception target user identifying information indicating a user as a target of the reception of the facsimile. The reception target user identifying information may be authenticated in the authentication device 319 of the subsidiary unit and may be user identifying information to be input from the authentication device 319 when the authentication succeeds, or may be a name of a user of a destination of the facsimile transmission. The name of the user of the destination of the facsimile transmission can be identified by performing an OCR (Optical Character Recognition) processing on the facsimile.

Here, for the notification priority information, the priority information may be associated with the notification method information for each piece of installation place information indicating an installation place of the subsidiary unit 30.

Third Modification

While facsimile reception notification information is notified to a predetermined notification destination when executable notification method information cannot be obtained from a subsidiary unit as a transfer target in the embodiments explained above, the facsimile reception notification information may be notified to a neighboring subsidiary unit.

In this case, it is only necessary that the executable notification method information obtaining unit obtains executable notification method information from a neighboring subsidiary unit locating in the neighborhood of the subsidiary unit as the transfer target among the at least one subsidiary unit when the executable notification method information cannot be obtained from the subsidiary unit as the transfer target, the determining unit determines a facsimile reception notification method that the neighboring subsidiary unit is caused to execute as a substitute based on the executable notification method information and the notification priority information, the notification method information notifier notifies the neighboring subsidiary unit of notification method information indicating the determined facsimile reception notification method, and the first notification executor of the neighboring subsidiary unit executes the facsimile reception notification method indicated in the notification method information notified by the server unit instead.

Here, the neighboring subsidiary unit may be any subsidiary unit whose IP address is allotted on the same subnet as the subsidiary unit as the transfer target. As for a method of determining the facsimile reception notification method, the same method as the embodiments explained above may be executed or the facsimile reception notification method may be determined to be the notification via the dialogue display.

Programs

Programs to be executed in the main body unit, the server unit, the subsidiary unit, and the portable terminal according to the embodiments and the modifications (hereinafter referred to as "units according to the embodiments and the modifications") may be provided by being recorded in a file of an installable format or of an executable format in a computer-readable storage medium such as a CD-ROM, a CD-R, a memory card, a DVD (Digital Versatile Disk), and a flexible disk (FD).

The programs to be executed in the units according to the embodiments and the modifications may be stored on a computer connected to a network such as the Internet and provided by being downloaded via the network. The programs to be executed in the units according to the embodiments and the modifications may be provided or distributed via a network such as the Internet. The programs to be executed in the units according to the embodiments and the modifications may be provided by being preloaded in a ROM and the like.

The programs to be executed in the units according to the embodiments and the modifications have a module configuration that enables realizing the units explained above on a computer. As an actual hardware, the functional units are configured to be realized on a computer when the CPU reads out from the ROM onto the RAM and execute the programs.

According to the embodiments, there is an advantage of being capable of causing a reception of a facsimile to be known to the surroundings.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. A facsimile system comprising:
a facsimile device;
an information processing device;
at least one image forming device; and
a portable terminal, wherein
the facsimile device comprises
   a facsimile receiver configured to receive a facsimile, and
   a facsimile notifier configured to notify the information processing device of the facsimile,
the information processing device including a memory storing computer-readable instructions and one or more processors configured to execute the computer-readable instructions such that the one or more processors are configured to
   specify a transfer target image forming device as a target of a transfer of the facsimile among the at least one image forming device,
   obtain, from the transfer target image forming device, executable notification method information indicating at least one facsimile reception notification method that is executable in the transfer target image forming device,
   obtain notification priority information in which priority information indicating a priority is associated for each piece of notification method information indicating a facsimile reception notification method,
   determine a facsimile reception notification method that the transfer target image forming device is caused to execute based on the executable notification method information and the notification priority information,
   notify the transfer target image forming device of notification method information indicating the determined facsimile reception notification method, and
   to instruct the transfer target image forming device to print the facsimile after the notification of the notification method information, and
the transfer target image forming device includes a memory storing computer-readable instructions and one or more processors configured to execute the computer-readable instructions such that the one or more processors are configured to
   execute the facsimile reception notification method indicated in the notification method information notified by the information processing device, and
   execute printing of the facsimile instructed by the information processing device, and
wherein the determined facsimile reception notification method is a notification method using the portable terminal, and wherein the first notification executor tries to make a connection to the portable terminal when the portable terminal comes to locate within a range after the notification of the notification method information by the information processing device, and notifies the portable terminal of notification method information for portable terminal indicating a facsimile reception notification method for portable terminal when the connection succeeds,
the portable terminal includes a memory storing computer-readable instructions and one or more processors configured to execute the computer-readable instructions such that the one or more processors are configured to
   try to make a connection to the transfer target image forming device when the transfer target image forming device comes to locate within the range, and
   execute the facsimile reception notification method for the portable terminal indicated in the notification method information for the portable terminal notified by the transfer target image forming device when the connection to the transfer target image forming device succeeds.

2. The facsimile system according to claim 1, wherein
the one or more processors of the transfer target image forming device are further configured to notify the information processing device of print start request information indicating whether to start printing the facsimile based on an operational input by a user after the execution of the facsimile reception notification method indicated in the notification method information notified by the information processing device,
the one or more processors of the information processing device are further configured to receive the print start request information notified by the transfer target image forming device, and print the facsimile when the print start request information received indicates to start printing.

3. The facsimile system according to claim 2, wherein
the one or more processors of the information processing device is further configured to
   determine an auxiliary facsimile reception notification method that the transfer target image forming device is further caused to execute among the at least one facsimile reception notification method, except for the determined facsimile reception notification method, indicated in the executable notification method information based on the notification priority information when the print start request information is not received, and
   notify the transfer target image forming device of auxiliary notification method information indicating the determined auxiliary facsimile reception notification method, and
wherein the one or more processors of the transfer target image forming device is further configured to
   execute the auxiliary facsimile reception notification method indicated in the auxiliary notification method information notified by the information processing device.

4. The facsimile system according to claim 1, wherein the one or more processors of the information processing device is further configured to notify a notifying destination of facsimile reception notification information indicating that the facsimile is transferred to the transfer target image forming device when the executable notification method information cannot be obtained from the transfer target image forming device.

5. The facsimile system according to claim 1, wherein the one or more processors of the information processing device is further configured to
   obtain the executable notification method information from a neighboring image forming device locating in a neighborhood of the transfer target image forming device among the at least one image forming device when the executable notification method information cannot be obtained from the transfer target image forming device,
   determine a facsimile reception notification method that the neighboring image forming device is caused to execute instead based on the executable notification method information and the notification priority information, and notify the neighboring image forming device of the notification method information indicating the determined facsimile reception notification method, and wherein the one or more processors of the transfer target image forming device is further configured to execute instead the facsimile reception notification method indicated in the notification method information notified by the information processing device.

6. The facsimile system according to claim 1, wherein the priority information is associated with the notification method information in the notification priority information for each piece of time zone information indicating a time zone, and wherein the one or more processors of the information processing device is further configured to determine a facsimile reception notification method that the transfer target image forming device is caused to execute further based on a current time.

7. The facsimile system according to claim 1, wherein the priority information is associated with the notification method information in the notification priority information for each piece of user identifying information indicating a user, and wherein the one or more processors of the information processing device is further configured to determine a facsimile reception notification method that the transfer target image forming device is caused to execute further based on reception target user identifying information indicating a user as a target of a reception of the facsimile.

8. The facsimile system according to claim 1, wherein the information processing device is connected to the facsimile device by one of an internal connection and an external connection, and the information processing device and the at least one image forming device are connected via a network.

9. The facsimile system according to claim 1, wherein the facsimile device, the information processing device, and the at least one image forming device are connected via a network.

10. An information processing device comprising:
a memory storing computer-readable instructions; and
one or more processors configured to execute the computer-readable instructions such that the one or more processors are configured to
    obtain a facsimile received by a facsimile device;
    specify a transfer target image forming device as a target of a transfer of the facsimile among at least one image forming device;
    obtain, from the transfer target image forming device, executable notification method information indicating at least one facsimile reception notification method that is executable in the transfer target image forming device;
    obtain notification priority information in which priority information indicating a priority is associated for each piece of notification method information indicating a facsimile reception notification method;
    determine a facsimile reception notification method that the transfer target image forming device is caused to execute based on the executable notification method information and the notification priority information;
    notify the transfer target image forming device of notification method information indicating the determined facsimile reception notification method;
    instruct the transfer target image forming device to print the facsimile after the notification of the notification method information; and
    receive print start request information indicating whether to start printing the facsimile from the transfer target image forming device after the notification of the notification method information, wherein the print instructor is configured to instruct the transfer target image forming device to print the facsimile when the print start request information received by the print start request information receiver indicates to start printing.

11. The information processing device according to claim 10, wherein
the one or more processors are further configured to
determine an auxiliary facsimile reception notification method that the transfer target image forming device is further caused to execute among the at least one facsimile reception notification method, except for the determined facsimile reception notification method, indicated in the executable notification method information based on the notification priority information when the print start request information is not received by the print start request information receiver, and
further notify the transfer target image forming device of auxiliary notification method information indicating the determined auxiliary facsimile reception notification method.

12. The information processing device according to claim 10, wherein the one or more processors are further configured to notify a notifying destination of facsimile reception notification information indicating that the facsimile is transferred to the transfer target image forming device when the executable notification method information cannot be obtained from the transfer target image forming device.

13. The information processing device according to claim 10, wherein the one or more processors are further configured to
obtain the executable notification method information from a neighboring image forming device locating in a neighborhood of the transfer target image forming device among the at least one image forming device when the executable notification method information cannot be obtained from the transfer target image forming device,
determine a facsimile reception notification method that the neighboring image forming device is caused to execute instead based on the executable notification method information and the notification priority information, and
notify the neighboring image forming device of the notification method information indicating the determined facsimile reception notification method.

14. The information processing device according to claim 10, wherein the priority information is associated with the notification method information in the notification priority information for each piece of time zone information indicating a time zone, and
the one or more processors are further configured to determine a facsimile reception notification method that the transfer target image forming device is caused to execute further based on a current time.

15. The information processing device according to claim 10, wherein the priority information is associated with the notification method information in the notification priority information for each piece of user identifying information indicating a user, and the one or more processors are further configured to determine a facsimile reception notification method that the transfer target image forming device is caused to execute further based on reception target user identifying information indicating a user as a target of a reception of the facsimile.

16. The information processing device according to claim 10, connected to the facsimile device by one of an internal connection and an external connection and connected to the at least one image forming device via a network.

17. The information processing device according to claim 10, connected to the facsimile device and the at least one image forming device via a network.

18. A non-transitory computer-readable storage medium with an executable program stored thereon and executed by a computer, wherein the program instructs the computer to perform:

obtaining a facsimile received by a facsimile device;

specifying a transfer target image forming device as a target of a transfer of the facsimile among at least one image forming device;

obtaining, from the transfer target image forming device, executable notification method information indicating at least one facsimile reception notification method that is executable in the transfer target image forming device;

obtaining notification priority information in which priority information indicating a priority is associated for each piece of notification method information indicating a facsimile reception notification method;

determining a facsimile reception notification method that the transfer target image forming device is caused to execute based on the executable notification method information and the notification priority information;

notifying the transfer target image forming device of notification method information indicating the determined facsimile reception notification method; and instructing the transfer target image forming device to print the facsimile after the notification of the notification method information, the determined facsimile reception notification method being a notification method using a portable terminal, and a connection to the portable terminal being attempted when the portable terminal is located within a range after the notification of the notification method information by an information processing device, wherein the portable terminal is notified of notification method information for portable terminal indicating a facsimile reception notification method for portable terminal when the connection succeeds, wherein the portable terminal tries to make a connection to the transfer target image forming device when the transfer target image forming device is located within the range, and wherein the facsimile reception notification method or the portable terminal indicated in the notification method information for the portable terminal notified by the transfer target image forming device is executed when the connection to the transfer target image forming device succeeds.

19. The non-transitory computer-readable storage medium of claim 18, wherein the program further instructs the computer to further perform:

notifying the information processing device of print start request information indicating whether to start printing the facsimile based on an operational input by a user after the execution of the facsimile reception notification method indicated in the notification method information notified by the information processing device, receiving the print start request information notified by the transfer target image forming device, and printing the facsimile when the print start request information received indicates to start printing.

20. The non-transitory computer-readable storage medium of claim 18, wherein the program further instructs the computer to further perform:

notifying destination of facsimile reception notification information indicating that the facsimile is transferred to the transfer target image forming device when the executable notification method information cannot be obtained from the transfer target image forming device.

* * * * *